US009809060B2

(12) United States Patent
Iwata

(10) Patent No.: US 9,809,060 B2
(45) Date of Patent: Nov. 7, 2017

(54) PNEUMATIC TIRE

(71) Applicant: SUMITOMO RUBBER INDUSTRIES, LTD., Kobe-shi, Hyogo (JP)

(72) Inventor: Yasutaka Iwata, Hyogo (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 750 days.

(21) Appl. No.: 14/360,397

(22) PCT Filed: Dec. 17, 2012

(86) PCT No.: PCT/JP2012/082654
§ 371 (c)(1),
(2) Date: May 23, 2014

(87) PCT Pub. No.: WO2013/099675
PCT Pub. Date: Jul. 4, 2013

(65) Prior Publication Data
US 2014/0326382 A1   Nov. 6, 2014

(30) Foreign Application Priority Data

Dec. 28, 2011 (JP) ................................. 2011-289681

(51) Int. Cl.
*B60C 11/03* (2006.01)
(52) U.S. Cl.
CPC ...... *B60C 11/0306* (2013.01); *B60C 11/0309* (2013.01); *B60C 2011/0346* (2013.01);
(Continued)
(58) Field of Classification Search
CPC ............. B60C 11/0306; B60C 11/0309; B60C 2011/0372; B60C 2011/0374;
(Continued)

(56) References Cited

U.S. PATENT DOCUMENTS 2,869,609 A * 1/1959 Balzhiser ............ B60C 11/0309
152/209.21
6,213,180 B1   4/2001 Himuro
(Continued)

FOREIGN PATENT DOCUMENTS

JP    10-278511 A   10/1998
JP    10-324117 A   12/1998
(Continued)

OTHER PUBLICATIONS

Search Report dated Jul. 23, 2015 for European Application No. 12861901.2.
(Continued)

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A pneumatic tire comprising a tread portion provided with a middle land portion 6 which is arranged between a central main groove 3 and a shoulder main groove 4. The middle land portion 6 is provided with an inner middle lateral groove 8 and an outer middle lateral groove 9. The inner middle lateral groove 8 comprises a first inclined portion 10 that extends axially outwardly from the central main groove 3 at an angle θ1 of from 10 to 40 degrees with respect to a circumferential direction of the tire, and a second inclined portion 12 that is inclined at an opposite direction to the first inclined portion 10 so as to extend axially inwardly, and a bent portion 11 connecting the first inclined portion 10 and the second inclined portion 12. The outer middle lateral groove 9 is communicated with the second inclined portion 12 of the axially inner middle lateral groove 8 without including an axially outermost groove edge 8e of the inner middle lateral groove 8, and is communicated with the (Continued)

shoulder main groove 4. The axially outer middle lateral groove 9 is inclined in the same direction of the first inclined portion 10 of the inner middle lateral groove 8 at an angle θ3 of from 30 to 70 degrees with respect to the circumferential direction of the tire.

14 Claims, 2 Drawing Sheets

(52) U.S. Cl.
CPC ............ *B60C 2011/0365* (2013.01); *B60C 2011/0367* (2013.01); *B60C 2011/0372* (2013.01); *B60C 2011/0374* (2013.01); *B60C 2011/0381* (2013.01); *B60C 2011/0388* (2013.01)

(58) Field of Classification Search
CPC ..... B60C 2011/0367; B60C 2011/0388; B60C 2011/0365; B60C 2011/0381; B60C 2011/0346
USPC ........... 152/209.18; D12/594, 600, 559, 564, D12/585, 556
See application file for complete search history.

(56) References Cited

U.S. PATENT DOCUMENTS

| | | | |
|---|---|---|---|
| D500,286 S | * | 12/2004 | Leynaert ............... D12/587 |
| D666,555 S | * | 9/2012 | Takano ............... D12/585 |
| 2009/0151832 A1 | | 6/2009 | Miyoshi et al. |
| 2010/0154952 A1 | | 6/2010 | Kageyama |

FOREIGN PATENT DOCUMENTS

| | | |
|---|---|---|
| JP | 11-245625 A | 9/1999 |
| JP | 2006-131081 A | 5/2006 |
| JP | 2006-240592 A | 9/2006 |
| JP | 2009-143327 A | 7/2009 |
| JP | 2010-143532 A | 7/2010 |

OTHER PUBLICATIONS

PCT/ISA/210—International Search Report dated Mar. 19, 2013, issued in PCT/JP2012/082654.

\* cited by examiner

PNEUMATIC TIRE

TECHNICAL FIELD

The present invention relates to a pneumatic tire that may offer better drainage performance and noise performance.

BACKGROUND ART

Typically, a pneumatic tire has a tread portion provided with a circumferentially and continuously extending main groove, and a plurality of lateral grooves communicated with the main groove. Such a pneumatic tire produces air column resonance noise from the main groove during traveling and it reaches outside a vehicle through the lateral grooves. Conventionally, in order to reduce such noise generated from the pneumatic tire, a lateral groove including a small-width part is proposed. The lateral groove with the small-width part may help to reduce the noise by disturbing the air column resonance.

Unfortunately, since the small-width part of the lateral groove may increase drainage resistance, the tire is liable to deteriorate its drainage performance.

RELATED ART DOCUMENTS

Patent Documents

[Patent Document 1] Japanese Unexamined Patent Application Publication H11-245625

SUMMARY OF THE INVENTION

Problem to be Solved by the Invention

The present invention has been worked out in the light of the circumstances described above, and has a main object of providing a pneumatic tire that may offer better drainage performance and noise performance.

Means for Solving the Problem

In accordance with the present invention, there is provided a pneumatic ire comprising a tread portion provided with a circumferentially and continuously extending central main groove on a tire equator or on each side of the tire equator, a pair of circumferentially and continuously extending shoulder main grooves axially outside the central main groove, and a pair of middle land portions each of which is arranged between the central main groove and the shoulder main groove on each side of the tire equator, the middle land portion provided with a plurality of inner middle lateral grooves and a plurality of outer middle lateral grooves, each inner middle lateral groove comprising a first inclined portion that extends axially outwardly from the central main groove at an angle of from 10 to 40 degrees with respect to a circumferential direction of the tire, and a second inclined portion that is inclined at an opposite direction to the first inclined portion so as to extend axially inwardly without reaching the central main groove, and a bent portion connecting the first inclined portion and the second inclined portion, each outer middle lateral groove comprising an axially inner end communicated with the inner middle lateral groove, and an axially outer end communicated with the shoulder main groove, the axially inner end of the outer middle lateral groove communicated with the second inclined portion of the axially inner middle lateral groove without including an axially outermost groove edge of the inner middle lateral groove, and the axially outer middle lateral groove inclined in the same direction of the first inclined portion of the inner middle lateral groove at an angle of from 30 to 70 degrees with respect to the circumferential direction of the tire.

Effect of the Invention

The pneumatic tire in accordance with the present invention may offer better drainage performance and noise performance.

MODE FOR CARRYING OUT THE INVENTION

Figure 1:
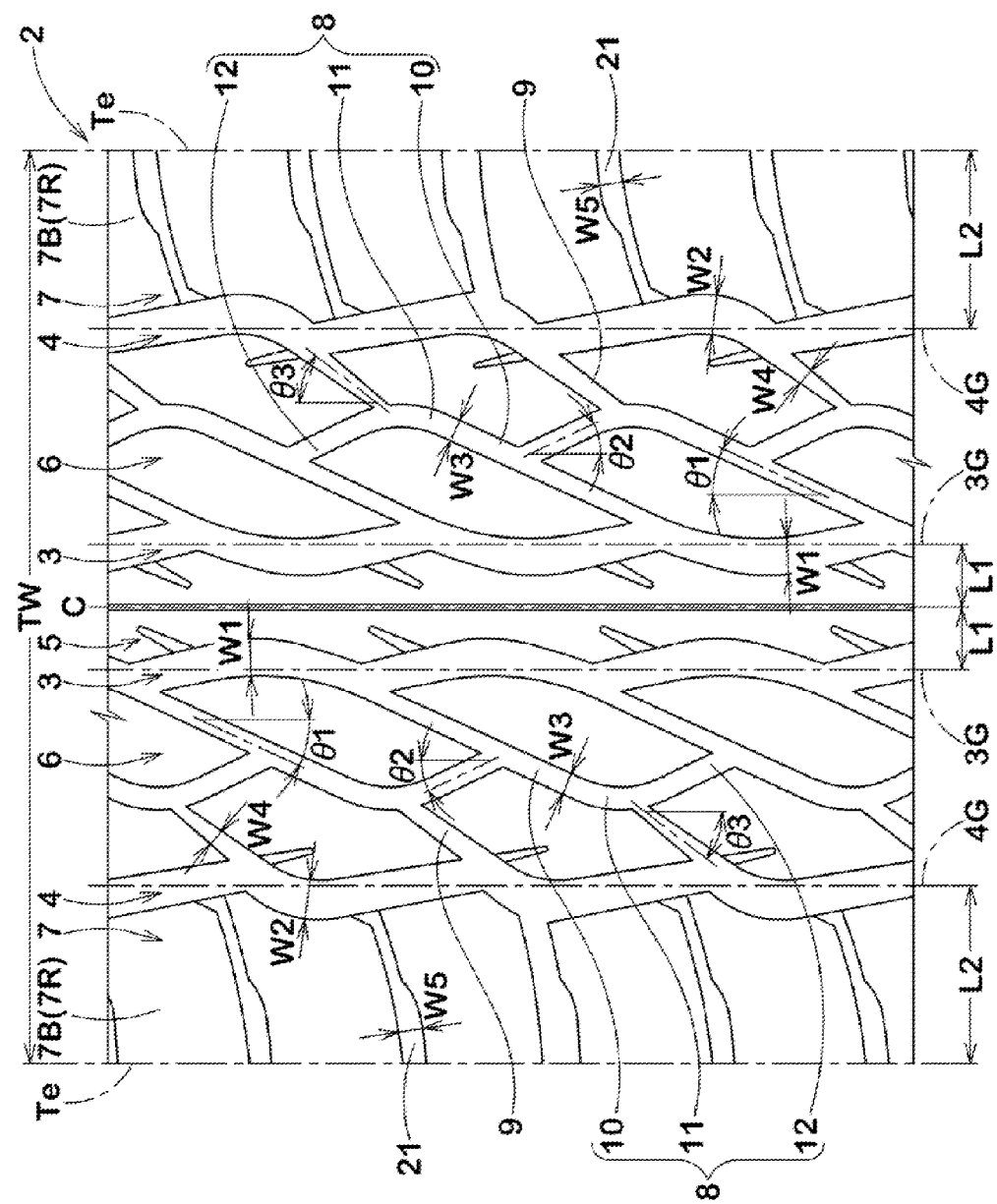
FIG. 1 is a development view illustrating a tread portion in accordance with an embodiment of the present invention.

An embodiment of the present invention will be explained below with reference to the accompanying drawings. As shown in FIG. 1, a pneumatic tire (hereinafter, it may be simply referred to the "tire") in accordance with the present embodiment is illustrated as an all season tire for a four-wheel drive vehicle. The tire 1 includes a tread portion 2.

The tread portion 2 is provided with a pair of circumferentially and continuously extending central man grooves 3 on each side of a tire equator C, and a pair of circumferentially and continuously extending shoulder main grooves 4 arranged axially outside of each central main groove 3. Thus, the tread portion 2 is divided into a plurality of land portions that include a central land portion 5 between the central main grooves 3 and 3, a pair of middle land portions 6 each of which is between the central main groove 3 and the shoulder main groove 4, and a pair of shoulder land portions 7 each of which is between the shoulder main groove 4 and a tread edge Te.

Here, the tread edges Te are the axial outermost edges of the ground contacting patch of the tire which occurs under a normally inflated loaded condition of the tire such that the tire is mounted on a standard wheel rim (not shown) with a camber angle of zero and inflated to a standard pressure and loaded with a standard tire load. Unless otherwise noted, various dimensions of the tire refer to those under a normally inflated unloaded condition of the tire such that the tire is mounted on the standard wheel rim and inflate to the standard pressure but loaded with no tire load. A tread width TW is defined as an axial width between the tread edges Te and Te under the normally inflated unloaded condition.

The standard wheel rim means a wheel rim officially approved or recommended for the tire by standards organizations, the standard wheel rim is the "standard rim" specified in JATMA, the "Measuring Rim" in ETRTO, and the "Design Rim" in TRA or the like, for example.

The standard pressure means the "maximum air pressure" in JATMA, the "Inflation Pressure" in ETRTO, and the maximum pressure given in the "Tire Load Limits at Various Cold Inflation Pressures" table in TRA or the like. In case of passenger car tires, however, the standard pressure is uniformly defined by 180 kPa.

The standard load is the "maximum load capacity" in JATMA, the "Load Capacity" in ETRTOC and the maximum value given in the above-mentioned table in TRA or the like. In case of passenger car tires, however, the standard tire load is uniformly defined by 88% of the maximum tire load.

Figure 2:
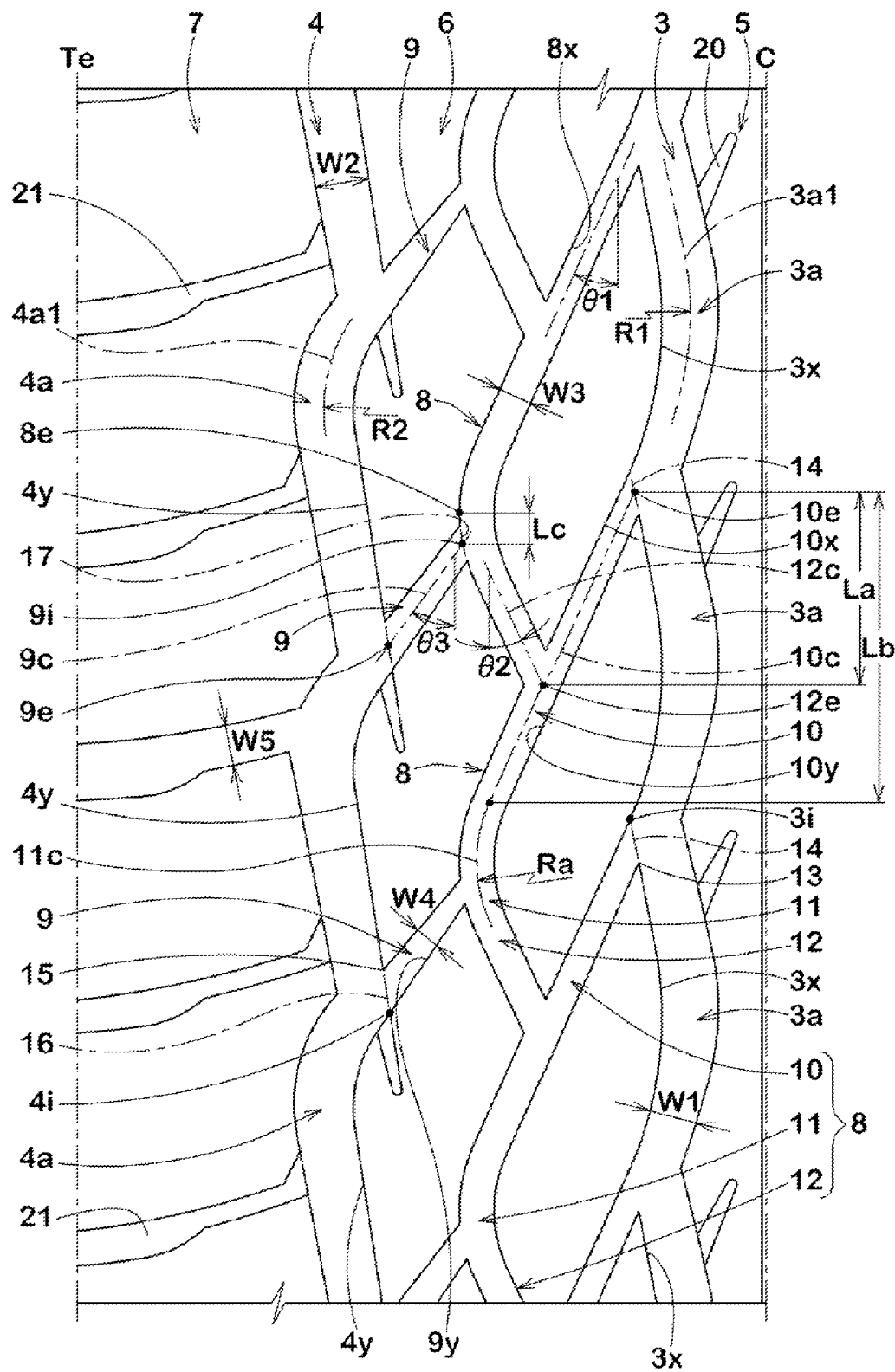
FIG. 2 is an enlarged view of the left side of FIG. 1.

As shown in FIG. 2, the central main groove 3 comprises a plurality of repeated arc portions 3a each of which has its center located axially outward. Thus, the central main groove 3 extends in a wavy manner in a circumferential direction of the tire by being connected the arc portions 3a one another.

The central main groove 3 includes a plurality of outer projected portions 3i that protrude axially outwardly. The outer projected portions 3i are the axially outermost positions of its axially outer groove edge 3x. When a groove is connected to a certain position of the axially outer groove edge 3x of the central main groove 3, the invisible axially outer groove edge at the position is imaginary determined so that the central main groove 3 has a closed void by smoothly expanding the visible part of the axially outer groove edge 3x to the position. Then the outer projected position 3i is determined using the axially outer groove edge 3x described above. In this embodiment, an imaginary outer groove edge 14 that extends from one end 13 of the arc portion 3a of the axially outer groove edge 3x is illustrated so that the central main groove 3 has the closed void. In this embodiment, the outer projected portion 3i is determined as a point at which the imaginary outer groove edge 14 and the visible axially outer groove edge 3x of the other are portion 3a intersect.

The shoulder main groove 4 comprises a plurality of repeated arc portions 4a each of which has its center located axially inward. This, the shoulder main groove 4 extends in a wavy manner in a circumferential direction of the tire by being connected the arc portions 4a one another.

The shoulder main groove 4 includes a plurality of inner projected portions 4i that protrude axially inwardly. The inner projected portions 4i are defined in the similar manner with the outer projected portions 3i. Namely, the inner projected portions 4i are the axially innermost positrons of its axially inner groove edge 4y. When a groove is connected to a certain position of the axially inner groove edge 4 of the shoulder main groove 4, the invisible axially inner groove edge at the position is imaginary determined so that the shoulder main groove 4 has a closed void by smoothly expanding the visible part of the axially inner groove edge 4y to the position. The inner projected portion 4i is determined using the axially inner groove edge 4y described above. In this embodiment, an imaginary inner groove edge 16 that extends from one end 15 of the arc portion 4a of the axially inner groove edge 4y is illustrated so that the shoulder main groove 4 has the closed void. In this embodiment, the inner projected portion 4i is determined as a point at which the imaginary outer groove edge 16 and the visible axially inner groove edge 4y of the other are portion 4a intersect.

The respective arc portions 3a and 4a may be formed having a curved shape like an arc as a whole. In another aspect of the arc portions, they may be formed to have a straight portion as a part.

The central main groove 3 and the shoulder main groove 4 may offer better drainage performance while reducing generation of the sir column resonance noise therein.

In order to improve the advantages described above, the arc portion 3a of the central main groove 3 preferably has its radius R1 in a range of from 30 to 100 mm. Similarly, the arc portion 4a of the shoulder main groove 4 preferably has its radius R2 in a range of from 10 to 70 mm.

Preferably, the central main groove 3 has a groove width W1 in a range of from 3.0% to 7.0% of the tread width TW, and a groove depth in a range of from 9.0 to 13.0 mm.

Preferably, the shoulder main groove 4 has a groove width W2 in a range of from 3.0% to 7.0% of the tread width TW, and a groove depth in a range of from 9.0 to 13.0 mm.

As shown in FIG. 1, the central main groove 3 has a zigzag-amplitude centerline 3G which is preferably located away from the tire equator C at an axial distance L1 of from 5% to 10% of the tread width TW, in order to further improve the drainage performance. Similarly, the shoulder main groove 4 has a zigzag-amplitude centerline 4G which is preferably located away from the tread edge Te at an axial distance L2 of from 15% to 25% of the tread width TW.

The middle land portion 6 is provided with a plurality of inner middle lateral grooves 8 and a plurality of outer middle lateral grooves 9.

Each inner middle lateral groove 8 extends from the central main groove 3. The inner middle lateral groove 8 communicates with the shoulder main groove 4 through the outer middle lateral groove 9. The water in the central main groove 3 therefore is drained to the shoulder main grooves 4 through these lateral grooves 8 and 9, thereby improving drainage performance.

As shown in FIG. 2, each inner middle lateral groove 8 comprises a first inclined portion 10, a second inclined portion 12 inclined at an opposite direction to the first inclined portion 10, and a bent portion 11 connecting the first inclined portion 10 and the second inclined portion 12.

The first inclined portion 10 extends axially outwardly from the outer projected portion 3i of the central main groove 3, for instance. The first inclined portion 10 has an angle $\theta 1$ in a range of from 10 to 40 degrees with respect to the circumferential direction of the tire. When the angle $\theta 1$ is less than 10 degrees, it might be difficult to drain the water in the central main groove 3 toward the shoulder main groove 4. When the angle $\theta 1$ is more than 40 degrees, drainage resistance during straight traveling ahead might be large. In view of the above, the angle $\theta 1$ is preferably in a range of from 15 to 35 degrees.

The second inclined portion 12 is inclined at the opposite direction to the first inclined portion 10 so as to extend axially inwardly. Thus, the inner middle lateral groove 8 is bent. Since the inner middle lateral groove 8 prevents generating of the air column resonance noise, the noise during traveling may be reduced.

The second inclined portion 12 terminates without reaching the central main groove 3I for instance. Regarding two adjacent inner middle lateral grooves 8, the second inclined portion 12 of the inner middle lateral groove 8 is further communicated with the first inclined portion 11 of the other inner middle lateral groove 8 which is below side in FIG. 2. In this embodiment the air passing through the first inclined portion 10 is divided into two passages of the shoulder main groove 4 and the second inclined portion 12. Since the amount of the air into the shoulder main groove 4 from the inner middle lateral groove 8 decreases, the noise performance of the tire may further be improved due to less air column resonance noise in the shoulder main groove 4.

The first inclined portion 10 of the inner middle lateral groove 8 in accordance with the present embodiment has an axially outer groove edge 10x that is smoothly continued to the axially outer groove edge 3x of the arc portion 3a. Thus, a part of the water flowing in the central main groove 3 is smoothly drained into the inner middle lateral groove 8. Furthermore, such a configuration of the groove edge 10x may offer the middle land portion 6 having high rigidity.

The inner middle lateral groove 8 has its groove centerline 1 (k. The groove centerline 10c has a first intersection 10e and a second intersection 12e. The first intersection 10e is a point at which the centerline 10c and the imaginary outer groove edge 14 of the central main groove 3 intersect. The second intersection 12e is a point at which the centerline 10c and the centerline 12c of the second inclined portion 12 intersect. The circumferential length La between the first and second intersections 10e and 12e is set in a range of from not less than 35%, more preferably not less than 40%, but preferably not more 85%, more preferably not more than 85%, more preferably not more than 80% of the circumferential length Lb of the first inclined portion 10. Thus, the water under the middle land portion 6 or in the central main groove 3 is efficiently drained into the shoulder main groove 4 and/or inner middle lateral groove 8. Furthermore, the air passing through the second inclined portion 12 may collide against the axially inner groove edge 10y of the first incline portion 10 of the inner middle lateral groove 8 so that the air column resonance noise may be disturbed.

In order to improve the drainage performance of the second inclined portion 12, the second inclined portion 12 is preferably inclined at an angle θ2 in a range of from 8 to 35 degrees, more preferably in a range of from 13 to 33 degrees. The angle θ2 is preferably set smaller than the angle θ1.

In order to further improve the drainage performance of the tire, the first inclined portion 10 and the second inclined portion 12 in this embodiment extend in a straight manner.

The bent portion 11 extends in an arc manner having its center located axially inwardly. The bent portion 11 may help to improve the rigidity of the middle land portion 6 and the drainage performance as well. Preferably, the bent portion 11 has its groove centerline 11c having a radius Ra in a range of from 15 to 90 mm. When the radius Ra is excessively large, it might be difficult to reduce the air column resonance noise. When the radius Ra is excessively small, it might increase drainage resistance thereof. More preferably, the radius Ra is in a range of from 25 to 80 mm.

The groove width W3 of the inner middle lateral groove 8 is preferably set in a range of from 40% to 80% of the groove width W1 of the central main groove 3 in order to further improve the drainage performance and the noise performance while maintaining the rigidity of the middle land portion 6. In the same point of views, the groove depth of the inner middle lateral groove 8 is preferably set in a range of from 8.0 to 12.0 mm.

The outer middle lateral groove 9 has an axially inner end 9i that is communicated with the second inclined portion 12 of the axially inner middle lateral groove 8 without including an axially outermost edge 8e of the inner middle lateral groove 8. The axially outer end 9e of the outer middle lateral groove 9 is communicated with the shoulder main groove 4. The outer middle lateral groove 9 may change the air pressure in the inner middle lateral groove 8 so that the air column resonance noise in the inner middle lateral groove 8 is reduced.

In this embodiment, the outer middle lateral groove 9 is communicated with the shoulder main groove 4 so as to include its inner projected portion 4i. Preferably, the axially inner groove edge 9y of the outer middle lateral groove 9 is smoothly connected to the axially inner groove edge 4y of the arc portion 4a of the shoulder main groove 4 to further improve the drainage performance.

Preferably, the circumferential length Lc between the axially inner end 9i of the outer middle lateral groove 9 and the axially outermost edge 8e of the inner middle lateral groove 8 is in a range of not less than 0.5 times, more preferably not less than 0.6 times, but preferably not more than 2.0 times, more preferably not more than 1.8 times the groove width W3 of the inner middle lateral groove 8. When the length Lc is excessively small, the effect for reducing the air column resonance noise may decrease. When the length Lc is excessively large, it might be difficult to drain the water in the first inclined groove 10 toward the shoulder main groove 4.

The axially inner end 9i of the outer middle lateral groove 9 is defined as an intersection at which the groove centerline 9c of the outer middle lateral groove 9 and the imaginary axially outer groove edge 8x of the inner middle lateral groove 8 intersect. Furthermore, the axially outer end 9o of the outer middle lateral groove 9 is defined as an intersection at which the imaginary axially inner groove edge 16 and the groove centerline 9c intersect.

The outer middle lateral groove 9 is inclined in the same direction of the first inclined portion 10 of the inner middle lateral groove 8. Thus, the water in the central main groove 3 may efficiently be drained to the shoulder main groove 4.

The outer middle lateral groove 9 has an angle θ3 in a range of from 30 to 70 degrees, more preferably in a range of from 40 to 60 degrees with respect to the circumferential direction of the tire. When the angle θ3 is less than 30 degrees or more than 70 degrees, it might increase the drainage resistance toward the shoulder main groove 4 from the central main groove 3.

In order to further improve the drainage performance as well as the noise performance, the absolute difference θ3−θ1 between the angle θ3 of the outer middle lateral groove 9 and the angle θ1 of the first inclined groove 10 is preferably in a range of not less than 5 degrees, more preferably not less than 10 degrees, but preferably not more than 30 degrees, more preferably not more than 25 degrees. When the absolute difference θ3−θ1 is excessively small, the noise performance tends to deteriorate because the air flowing into the outer middle lateral groove 9 sent out from the first inclined portion 10 produces the air column resonance noise in the shoulder ma groove 4. When the absolute difference θ3−θ1 is excessively large, the drainage resistance may increase. Preferably, the angle θ3 is set larger than the angle θ1.

Preferably, the groove width W4 of the outer middle lateral groove 9 is increasing axially outwardly to further improve the drainage performance toward the shoulder main groove 4 in order to further improve the noise performance, the groove width W4 is preferably set in a range of from 20% to 75% the groove width W2 of the shoulder main groove 4. In the same point of view, the outer middle lateral groove preferably has its groove depth in a range of from 6.0 to 11.0 mm.

The central land portion 5 is provided with a plurality of central lug grooves 20 which extend from both central main grooves 3 toward axially inwardly without reaching the tire equator C. Thus, the central land portion 5 is formed as a rib extending continuously in the circumferential direction of the tire.

The shoulder land portion 7 is provided with a plurality of shoulder lateral grooves 21 each of which extends from the shoulder main groove 4 toward axially outwardly beyond the tread edge Te to improve the drainage performance. The shoulder land portion 7 is configured as a shoulder block row 7R that includes a plurality of shoulder blocks 7B each of which is surrounded among the shoulder main groove 4, shoulder lateral groove 21, and the tread edge Te.

The shoulder lateral grooves 21 preferably have groove widths W5 in a range of from 2.0 to 8.0 mm and groove depths in a range of from 6.0 to 10.0 mm, in order to improve drainage performance and noise performance of the tire in well-balanced.

While the particularly preferable embodiments of the present invention have been described in detail, the present invention in not limited to the illustrated embodiments, but can be modified and carried out in various aspects.

microphone installed near the driver's ear on the window side, and then a sound pressure level of a peak value of the air column resonance was measured around a narrow band of 240 Hz. Evaluation results are shown with an index of 100 representing a value in Ref. 1. Larger the values, the better the performance is. Test results are shown in Table 1.

TABLE 1

|  | Ref. 1 | Ex. 1 | Ex. 2 | Ex. 3 | Ref. 2 | Ref. 3 | Ex. 4 | Ex. 5 | Ref. 4 | Ex. 6 | Ex. 7 |
| --- | --- | --- | --- | --- | --- | --- | --- | --- | --- | --- | --- |
| First inclined portion angle θ1 (deg.) | 5 | 25 | 10 | 40 | 45 | 25 | 25 | 25 | 25 | 25 | 25 |
| Outer middle lateral groove angle θ3 (deg.) | 50 | 50 | 50 | 50 | 50 | 25 | 30 | 70 | 75 | 50 | 50 |
| Radius of bent portion Ra (mm) | 50 | 50 | 50 | 50 | 50 | 50 | 50 | 50 | 50 | 10 | 15 |
| Ratio La/Lb (%) | 60 | 60 | 60 | 60 | 60 | 60 | 60 | 60 | 60 | 60 | 60 |
| Ratio Lc/W3 | 1 | 1 | 1 | 1 | 1 | 1 | 1 | 1 | 1 | 1 | 1 |
| Noise performance (Index) | 100 | 110 | 105 | 100 | 90 | 100 | 105 | 100 | 90 | 110 | 108 |
| Drainage performance (Index) | 100 | 110 | 105 | 105 | 105 | 100 | 105 | 105 | 105 | 95 | 100 |
|  | Ex. 8 | Ex. 9 | Ex. 10 | Ex. 11 | Ex. 12 | Ex. 13 | Ex. 14 | Ex. 15 | Ex. 16 | Ex. 17 |  |
| First inclined portion angle θ1 (deg.) | 25 | 25 | 25 | 25 | 25 | 25 | 25 | 25 | 25 | 25 |  |
| Outer middle lateral groove angle θ3 (deg.) | 50 | 50 | 50 | 50 | 50 | 50 | 50 | 50 | 50 | 50 |  |
| Radius of bent portion Ra (mm) | 90 | 95 | 50 | 50 | 50 | 50 | 50 | 50 | 50 | 50 |  |
| Ratio La/Lb (%) | 60 | 60 | 30 | 35 | 85 | 90 | 60 | 60 | 60 | 60 |  |
| Ratio Lc/W3 | 1 | 1 | 1 | 1 | 1 | 1 | 0.4 | 0.5 | 2 | 2.2 |  |
| Noise performance (Index) | 100 | 95 | 95 | 100 | 108 | 110 | 95 | 100 | 108 | 110 |  |
| Drainage performance (Index) | 108 | 110 | 110 | 108 | 100 | 95 | 110 | 108 | 100 | 95 |  |

La: Circumferential length from first intersection at which groove centerlines of second inclined portion and f irst inclined portion intersect to second intersection at which groove centerline of first inclined portion and imaginary groove edge of central main groove intersect
Lb: Circumferential length of first inclined portion
Lc: Circumferential length from axially outermost groove edge of the inner middle lateral groove to intersection at which groove centerline of outer middle lateral groove and imaginary groove edge of inner middle lateral groove intersect
W3: Groove width of inner middle lateral groove Comparison Test Pneumatic tires each having a the size of 275/55R20 with a basic tread pattern of FIG. 1 except for the detail shown in Table 1 were made and tested with respect to the drainage performance and poise performance. The major specifications of tires are as follows.
  Tread width TW: 225 mm
  Central Main Groove
  Groove width W1: 7.2 to 8.2 mm
  Groove depth: 11.3 mm
  Axial length L1/Tread width TW: 7%
  Shoulder Main Groove
  Groove width W2: 5.6 to 7.6 mm
  Groove depth: 11.3 mm
  Axial length L2/Tread width TW: 20%
  Inner Middle Lateral Groove
  Groove depth: 8.0 mm
  Outer Middle Lateral Groove
  Groove depth 9.8 mm
  Drainage Performance Test (Lateral Hydroplaning Test)

Each test tire mounted on a rim of 20×9J with an internal pressure of 230 kPa was installed on a test vehicle with four-wheel drive having a displacement of 5,600 cc. Then, the test vehicle was entered into a course with a water puddle 10 mm deep and 20 m long, on an asphalt road surface with a radius of 100 m, with stepwise speed increase. Then, lateral acceleration (lateral G) of the vehicle was measured, and average lateral G of the front wheels at speeds of 55 to 80 km/h was calculated. Calculation results are shown with an index of 100 representing a value in Ref.1. Larger the values, the better the performance is.
  Noise Performance Test The foregoing test vehicle was run at a speed of 60 km/h on a road noise measurement road (rough asphalt road surface), and interior vehicle noise was picked up through a From the test results, it was confirmed that Example tires in accordance with the present invention can be effectively improved tire noise performance as well as drainage performance.

DESCRIPTION OF THE REFERENCE NUMERALS

2 Tread portion
3 Central main groove
4 Shoulder main groove
6 Middle land portion
8 Inner middle lateral groove
8e Outermost edge of inner middle lateral groove
9 Outer middle lateral groove
10 First inclined portion
11 Bent portion
12 Second inclined portion

The invention claimed is:
1. A pneumatic tire comprising:
  a tread portion provided with
  a circumferentially and continuously extending central main groove on a tire equator or on each side of the tire equator,
  a pair of circumferentially and continuously extending shoulder main grooves axially outside the central main groove, and
  a pair of middle land portions each of which is arranged between the central main groove and the shoulder main groove on each side of the tire equator,
  wherein
  the central main groove extends in a wavy manner comprising a plurality of repeated arc portions each of which has its center located axially outward thereof to include a plurality of outer projected peak portions that protrude axially outermost, each of the middle land portions is provided with a plurality of inner middle lateral grooves and a plurality of outer middle lateral grooves, each of the inner middle lateral grooves comprises a first inclined portion that extends axially outwardly from the central main groove at an angle of from 10 to 40 degrees with respect to a circumferential direction of the tire, a second inclined portion that is inclined at an opposite direction to the first inclined portion so as to extend axially inwardly without reaching the central main groove, and a bent portion connecting the first inclined portion and the second inclined portion, wherein each of the inner middle lateral grooves extends from each of the outer projected peak portions of the central main groove, each outer middle lateral groove comprises an axially inner end communicated with the inner middle lateral groove, and an axially outer end communicated with the shoulder main groove, the axially inner end of the outer middle lateral groove communicates with the second inclined portion of the axially inner middle lateral groove without including an axially outermost groove edge of the inner middle lateral groove, and the axially outer middle lateral groove inclines in the same direction of the first inclined portion of the inner middle lateral groove at an angle of from 30 to 70 degrees with respect to the circumferential direction of the tire.

2. The pneumatic tire according to claim 1, wherein the second inclined portion of each of the inner middle lateral grooves is communicated with the first inclined portion of the other inner middle lateral groove adjacent thereto.

3. The pneumatic tire according to claim 1, wherein each of the outer middle lateral grooves has a groove width gradually increasing axially outwardly.

4. The pneumatic tire according to claim 1, wherein the bent portion extends in an arc manner having a radius of curvature in a range of from 15 to 90 mm.

5. The pneumatic tire according to claim 1, wherein each of the shoulder main grooves extends in a wavy manner comprising a plurality of repeated arc portions each of which has its center located axially inwardly to include a plurality of inner projected peak portions that protrude axially inwardly, and each of the outer middle lateral grooves extends from each of the inner projected peak portions.

6. The pneumatic tire according to claim 1, wherein the angle of each of the outer middle lateral grooves is larger than that of the first inclined portion.

7. The pneumatic tire according to claim 2, wherein each of the outer middle lateral grooves has a groove width gradually increasing axially outwardly.

8. The pneumatic tire according to claim 2, wherein the bent portion extends in an arc manner having a radius of curvature in a range of from 15 to 90 mm.

9. The pneumatic tire according to claim 3, wherein the bent portion extends in an arc manner having a radius of curvature in a range of from 15 to 90 mm.

10. The pneumatic tire according to claim 2, wherein each of the shoulder main grooves extends in a wavy manner comprising a plurality of repeated arc portions each of which has its center located axially inwardly to include a plurality of inner projected peak portions that protrude axially inwardly, and each of the outer middle lateral grooves extends from each of the inner projected peak portions.

11. The pneumatic tire according to claim 3, wherein each of the shoulder main grooves extends in a wavy manner comprising a plurality of repeated arc portions each of which has its center located axially inwardly to include a plurality of inner projected peak portions that protrude axially inwardly, and each of the outer middle lateral grooves extends from each of the inner projected peak portions.

12. The pneumatic tire according to claim 4, wherein each of the shoulder main grooves extends in a wavy manner comprising a plurality of repeated arc portions each of which has its center located axially inwardly to include a plurality of inner projected peak portions that protrude axially inwardly, and each of the outer middle lateral grooves extends from each of the inner projected peak portions.

13. The pneumatic tire according to claim 1, wherein the first inclined portion comprises an axially outer groove edge that is smoothly continued to an axially outer groove edge of one of the arc portions of the central main groove.

14. The pneumatic tire according to claim 1, wherein the first inclined portion comprises an axially outer groove edge extending in a straight manner so as to be tangent to an axially outer groove edge of one of the arc portions of the central main groove.

* * * * *